W. GARDINER.
COVER FOR STORAGE BATTERIES.
APPLICATION FILED OCT. 4, 1919.

1,342,954.

Patented June 8, 1920.
2 SHEETS—SHEET 1.

Witness:
Stephen F. Rebora

Inventor
William Gardiner,
By Chas. C. Bulkley Attys

W. GARDINER.
COVER FOR STORAGE BATTERIES.
APPLICATION FILED OCT. 4, 1919.
1,342,954.
Patented June 8, 1920.
2 SHEETS—SHEET 2.
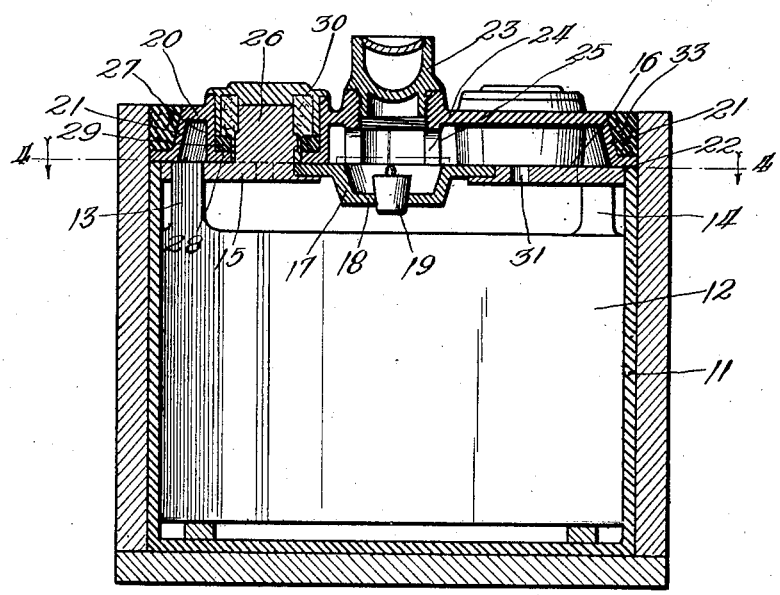
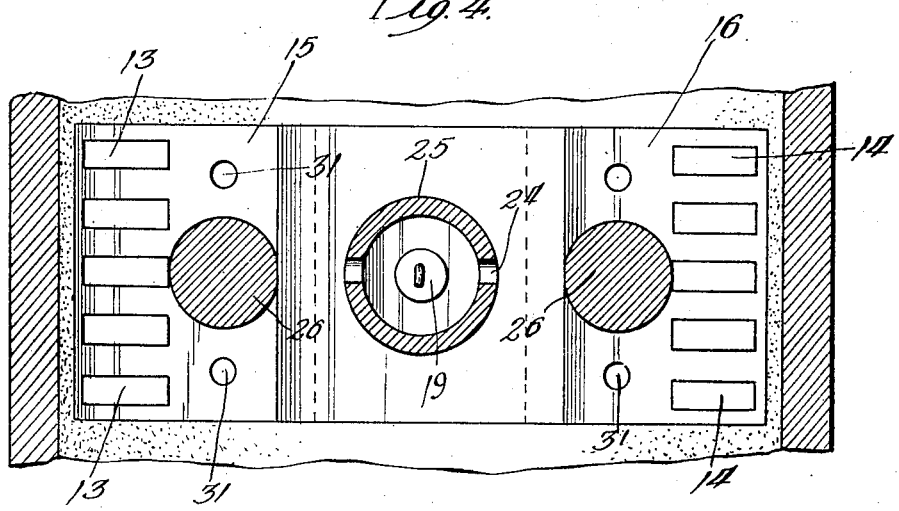
Witness:
Stephen F. Kelma
Inventor
William Gardiner,
By Chas. E. Bulkley
Attys

UNITED STATES PATENT OFFICE.

WILLIAM GARDINER, OF CHICAGO, ILLINOIS.

COVER FOR STORAGE BATTERIES.

1,342,954.  Specification of Letters Patent.  Patented June 8, 1920.

Application filed October 4, 1919. Serial No. 328,545.

*To all whom it may concern:*

Be it known that I, WILLIAM GARDINER, a citizen of the United States of America, and resident of Chicago, Cook county, Illinois, have invented a certain new and useful Improvement in Covers for Storage Batteries, of which the following is a specification.

My invention relates to an improvement in covers for storage batteries, and has for its object an improved and more efficient and economical structure whereby undue heating of the battery is prevented and in which improved means are provided for permitting the escape of gases from the battery.

Further specific objects of my invention relate to an improved construction of the terminals which pass through the cover.

These and other features and objects of my invention will be more readily understood by having reference to the accompanying drawings, in which I have illustrated one specific embodiment of my invention.

Fig. 3 is a sectional view taken on the line 3—3 of Fig. 2.

Fig. 4 is a plan section taken on the line 4—4 of Fig. 3.

Figure 1:
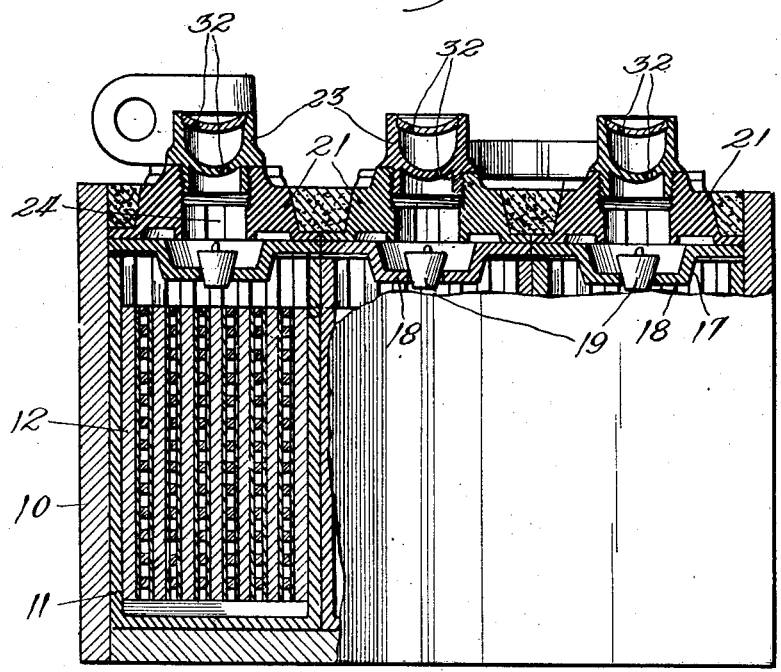
Figure 1 is a side view, partly in section, of a complete battery comprising three cells embodying the features of my invention.
Figure 2:
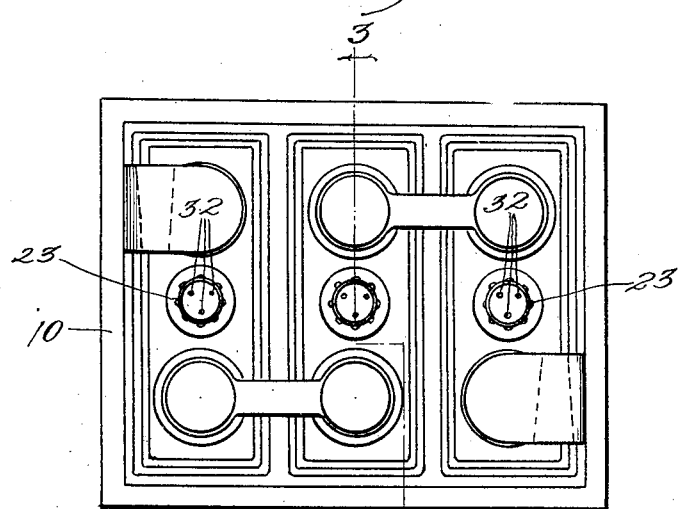
Fig. 2 is a plan view of the same.

I have illustrated an outside battery box 10 of wood, or other suitable insulating material, for holding the three cells to make up one completed unit. These cells are of similar construction, and, therefore, I will describe but one of same. 11 represents a battery jar of rubber or other suitable material mounted within the battery box, and within this jar are arranged a series of positive and negative plates 12 with the usual separators in the well known manner. Extending upwardly from each of the positive plates, and at one side of the battery, there is a terminal 13, while extending upwardly from each of the negative plates at the opposite side of the battery there is a terminal 14. Each of the positive terminals 13 passes through an opening in a metallic connecting strap 15, the upper end of these terminals being burned or otherwise secured to this metallic strap so as to form a solid and unitary connection therewith. In a similar manner, each of the negative terminals 14 extends through an opening in the metallic connecting strap 16 and is burned or secured to this strap. The inner edge of each of the metallic straps 15 and 16 is cut away so as to form a ledge upon which rests the outer edges of a central member 17, this member being made of suitable insulating material, such as rubber or fiber, and being provided with a central cylindrical protuberance 18 which projects downward below the level of the metallic straps 15 and 16 and terminates a short distance above the upper edge of the electrode plates. This extension or protuberance 18 is for the purpose of properly regulating the amount of electrolyte in the battery and the lower surface determines the proper level for the electrolyte. A central opening, in which is inserted a plug, 19, is provided to permit the passage of a suitable testing tool. It will thus be seen that these two connecting straps and the central member 17 which is supported by these straps and suitably secured thereto, form the bottom of a box-shaped cover, the upper part of which is formed by the member 20 having downwardly extending flanges 21 at its outer edge provided with laterally extending projections 22 which rest upon the outer edge of the metallic straps 15 and 16, and the upper edge of the battery cell 11. This member 20 is provided with a central opening closed by a screw plug 23. Extending downwardly from the member 20, and surrounding the central opening, there is a cylindrical flange 24 having opposite slots or openings 23. On opposite sides of the central opening are a pair of cylindrical openings for the passage of the terminal posts 26 which extend upwardly from the connecting straps 15 and 16. Surrounding these cylindrical openings are downwardly extending cylindrical flanges 27 provided with inward lateral projections 28 which closely engage the terminal posts. In order to form a connection with this terminal post, a flexible washer 29 is first slipped over the end of the post and rests upon the lateral projections 28, then the cup-shaped receptacle formed around this post is filled with putty, then the cup-shaped terminal 30 pressed into this putty, and then this cup-shaped terminal 30 burned to the connection post 26. The use of putty in this connection is particularly advantageous as it forms a perfectly tight connection, and yet when it is desired to disconnect the terminal 30 it is but necessary to re-heat the same to break its connection with the terminal 26, as this re-heating likewise softens the putty so as to enable the terminal 30 to be readily removed therefrom.

In order to permit the escape of gases from the battery, the terminal plates 15 and 16 are provided with openings 31 to permit the gases to escape into the space between the upper and lower covers from whence they pass through the cut-away or notched portions 25 in the central cylindrical flange 24, and thence pass through the openings 32 in the plug or stopper 23. The gases are thus forced to pass through a circuitous path, and thereby all danger of the electrolyte splashing out of the battery is prevented. The cover assembled in this manner is suitably secured to the battery box by sealing material 33, and in this manner a perfectly tight cover is formed, and yet one in which suitable air space is provided to aid in preventing undue heating of the battery. Likewise, by having the connection straps perform the double function of forming a part of the double cover, as well as performing their function as a connecting strap, I greatly decrease the cost of this cover, as it is but necessary to have a small central portion added to these connection straps to form the bottom of the cover. Furthermore, by having the connection straps thus forming a part of the bottom of the cover, they are raised slightly higher than in cases where they are arranged below the cover, thus giving an increased space above the electrode plates for the electrolyte.

While I have illustrated and described one particular embodiment of my invention, it will be understood that I do not wish to be limited to the exact construction shown and described, but that various changes and modifications may be made without departing from the spirit and intent of my invention.

What I claim as my invention is:—

1. In a storage battery, a containing cell, a box-shaped cover therefor, the bottom member of said cover being formed by a pair of metallic plates being connected together by an insulating member, electrode plates in said cell, and connections from said metallic plates to electrode plates.

2. In storage battery construction, a containing cell, a plurality of electrode plates mounted therein, a cover for said cell, said cover including a bottom member composed of a pair of metallic straps and a central insulating member connecting together said metallic straps, and connections from said metallic straps to said electrode plates, said central insulating member being provided with a downward extension, the bottom surface of said extension being properly positioned so as to properly determine the height of the liquid in said containing cell.

3. In storage battery construction, a containing cell, a plurality of positive and negative electrode plates alternately arranged therein, an upwardly projecting terminal from each of said positive plates, a metallic connecting strap connecting said terminals, an upwardly projecting terminal from each of said negative plates, a metallic strap connecting each of said terminals, an insulating member connecting said connecting straps, and a box-shaped insulating member secured to the outer edges of said straps and forming therewith a hollow cover for said battery.

4. In battery construction, a containing cell, a plurality of electrode plates mounted in said cell, a cover for said cell, said cover comprising a hollow box-like structure having a top plate provided with a central opening, a cylindrical flange surrounding said central opening and extending downwardly therefrom, openings in the side of said flange, and openings through the bottom of said cover on opposite sides of said central opening, whereby the gases first pass through said lateral openings, thence through the openings in said flange, thence through the central opening in the cover.

Signed by me at Chicago, Illinois, this 30th day of September, 1919.

WM. GARDINER.